(12) United States Patent
Yim

(10) Patent No.: US 8,307,727 B2
(45) Date of Patent: Nov. 13, 2012

(54) RECIPROCATING AND ROTATING TYPE POWER TRANSFORMING APPARATUS

(75) Inventor: Jin Whan Yim, Goyang-si (KR)

(73) Assignee: Aden Limited (KR)

( * ) Notice: Subject to any disclaimer, the term of this patent is extended or adjusted under 35 U.S.C. 154(b) by 404 days.

(21) Appl. No.: 12/664,225

(22) PCT Filed: Jul. 9, 2007

(86) PCT No.: PCT/KR2007/003317
§ 371 (c)(1),
(2), (4) Date: Dec. 11, 2009

(87) PCT Pub. No.: WO2009/008559
PCT Pub. Date: Jan. 15, 2009

(65) Prior Publication Data
US 2010/0180703 A1 Jul. 22, 2010

(51) Int. Cl.
*F16H 21/18* (2006.01)
(52) U.S. Cl. ................................. 74/49; 74/44
(58) Field of Classification Search ............... 74/25, 49, 74/50, 60, 44
See application file for complete search history.

(56) References Cited

U.S. PATENT DOCUMENTS

| | | | | |
|---|---|---|---|---|
| 2,780,502 A | * | 2/1957 | Emele | 384/430 |
| 2,824,416 A | * | 2/1958 | Orelind | 56/296 |
| 3,104,511 A | * | 9/1963 | Clark | 56/296 |
| 3,648,444 A | * | 3/1972 | Dunn | 56/296 |
| 4,192,261 A | * | 3/1980 | Berg | 123/56.4 |
| 4,735,036 A | * | 4/1988 | Alexander | 56/12.6 |
| 2004/0216540 A1 | | 11/2004 | Choi | |

FOREIGN PATENT DOCUMENTS

| | | |
|---|---|---|
| CA | 2046599 | 6/1991 |
| GB | 2232452 A * | 12/1990 |
| JP | 2000-074169 | 3/2000 |
| JP | 2002-286112 | 10/2002 |

OTHER PUBLICATIONS

International Search Report—PCT/KR2007/003317 dated Apr. 8, 2008.

* cited by examiner

*Primary Examiner* — Troy Chambers
*Assistant Examiner* — Terence Boes
(74) *Attorney, Agent, or Firm* — Cantor Colburn LLP

(57) ABSTRACT

Provided is a reciprocating rotary power transforming apparatus that can simplify its structure, reduce loss of friction energy occurring from motion transformation, and perform transformation between a reciprocating rotary motion and a uni-directional rotary motion. The reciprocating rotary power transforming apparatus includes a reciprocating rotary axis performing a reciprocating rotary motion, a uni-directional rotary axis performing a unidirectional rotary motion, a housing being disposed so that the reciprocating rotary axis and the uni-directional rotary axis may be orthogonal to each other on the same plane and being supported to un-restrict its rotation, and a motion transforming unit being connected to the reciprocating rotary axis and being constructed to perform transformation between the reciprocating rotary motion and the uni-directional rotary motion by a conical rotary motion and a twisting motion when power is transferred to the reciprocating rotary axis or to the uni-directional rotary axis.

4 Claims, 6 Drawing Sheets

【FIGURE 1A】
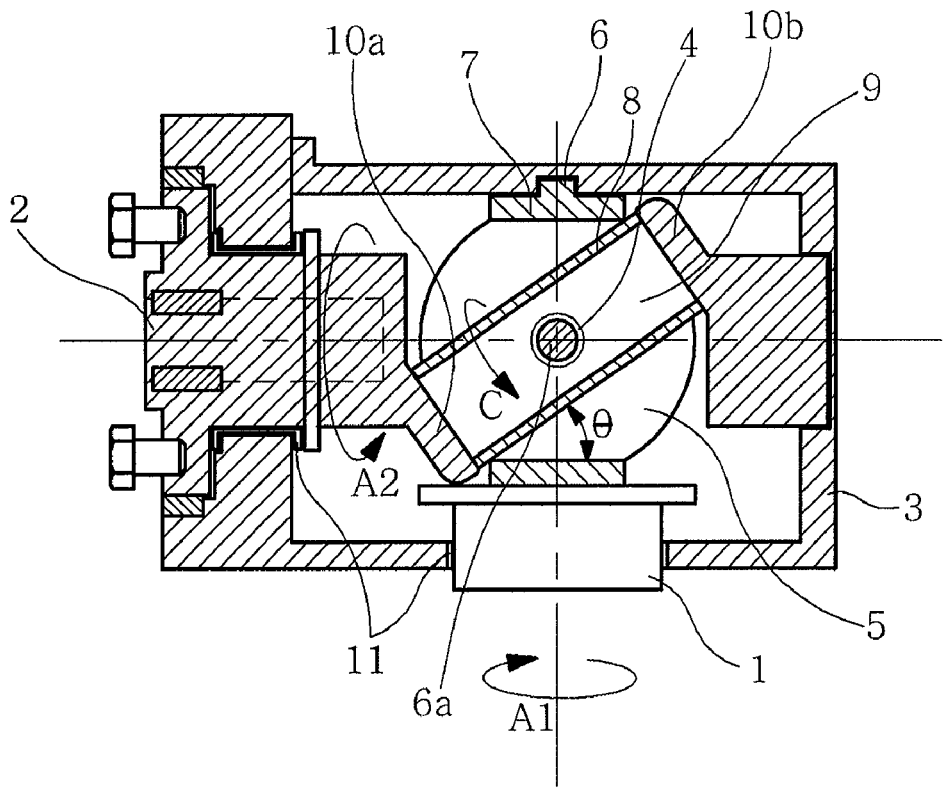
【FIGURE 1B】
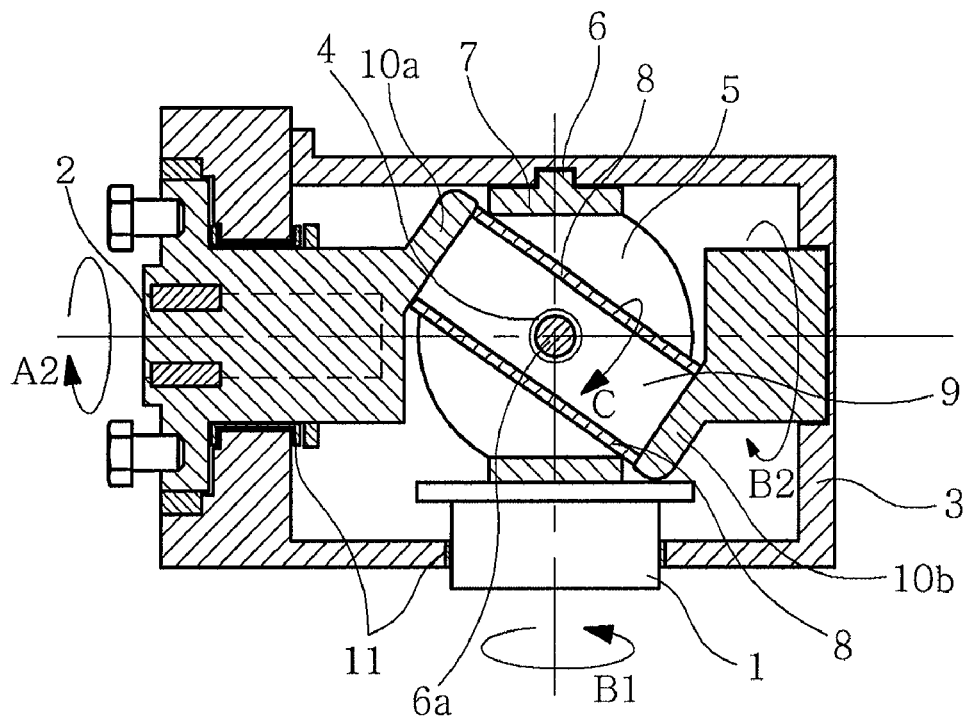

【FIGURE 2】
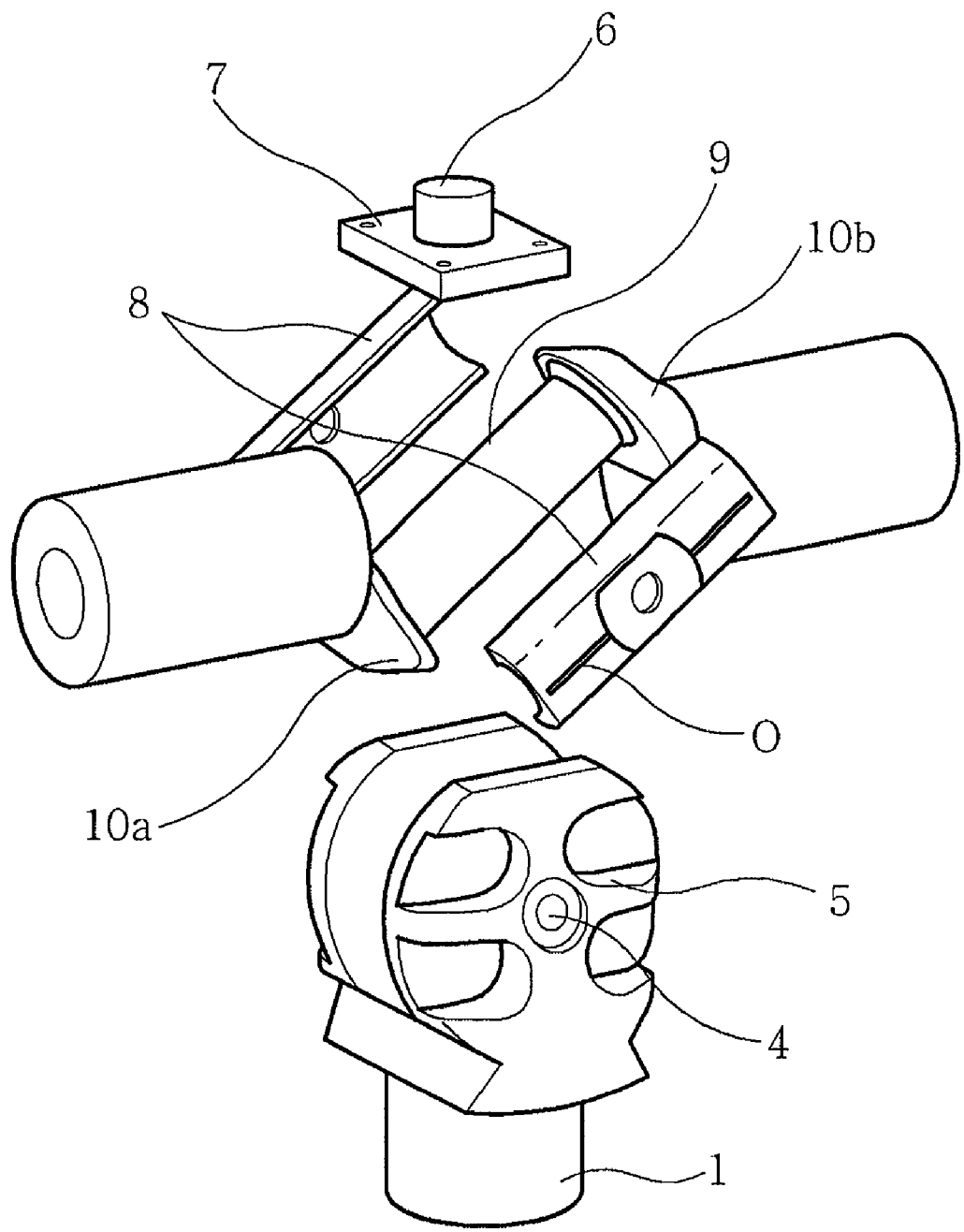

【FIGURE 5】
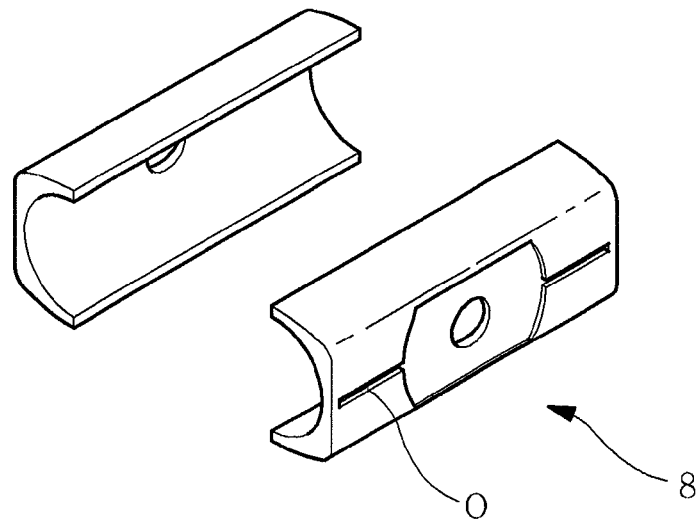
【FIGURE 6】
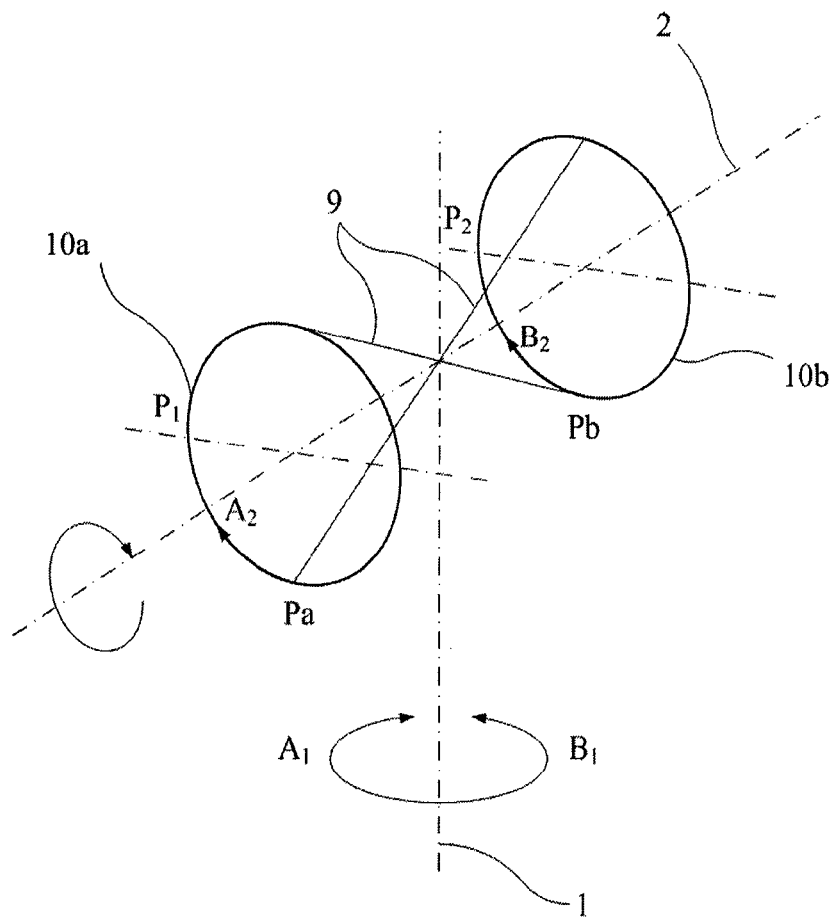

RECIPROCATING AND ROTATING TYPE POWER TRANSFORMING APPARATUS

TECHNICAL FIELD

The present invention relates to a reciprocating rotary power transforming apparatus, and more particularly, to a reciprocating rotary power transforming apparatus that can transform a reciprocating rotary motion to a uni-directional rotary motion, or can transform the uni-directional rotary motion to the reciprocating rotary motion.

BACKGROUND ART

Generally, a crank instrument may be used to transform a reciprocating linear motion to a uni-directional rotary motion in an apparatus such as a vehicle and the like. The crank instrument includes a piston and a connecting rod of which one end is connected to the piston and another end is connected to a crank axis.

When the piston installed in an engine of a vehicle performs the reciprocating linear motion, the connecting rod and the crank axis transform the reciprocating linear motion of the piston to a reciprocating motion and thus a driving force is transferred to the vehicle. Also, when the reciprocating motion of the crank axis is an input end, the reciprocating linear motion of the piston may be obtained from an output end. Here, in order to transform the reciprocating linear motion to the uni-directional rotary motion using the connecting rod, the eccentric crank axis, and the like, a rotary radius according to the moved distance of the piston and the eccentricity of the connecting rod, a rotary radius needs to be secured. Therefore, a large capacity is required and thereby weight also increases.

In order to solve the above problems, a rotary engine such as a Wankel engine and the like has been developed. However, the structure of the Wankel engine is complex and thus it is difficult to manufacture the Wankel engine. Also, due to the structure of a sealed chamber, an intake and exhaust problem, and the like, a high power engine cannot be applied. Therefore, there is a need for development of a small ad efficient crank instrument.

For example, a torus crank instrument disclosed in Korean Patent Application No. 0404446, as shown in FIGS. 7 and 8, includes a housing 50 being formed in a square box, a fixing block 51 being disposed in the housing 50 to form four chambers, a rotor body 52 being inserted into the chambers, an output bevel gear 53 being coupled in each of upper and lower portions of the rotor body 52, a core 55 including four axes 54 to be rotatably coupled with the output bevel gear 53, and a cover 56 being coupled with the housing 50 to restrict the rotor body 52.

However, the configuration of the crank instrument is very complex and thus it is very difficult to manufacture the crank instrument. Also, a plurality of bevel gears rotates with engaged into each other. Therefore, a power transfer path is very complex and thereby friction increases and a power efficiency decreases.

Also, since a driving portion includes four bevel gears and two output bevel gears, abrasion or noise may occur when driving the gears.

DISCLOSURE

Technical Problem

An aspect of the present invention provides a reciprocating rotary power transforming apparatus that can simplify the entire structure of a power transforming apparatus and also can be readily maintained and repaired.

Another aspect of the present invention also provides a reciprocating rotary power transforming apparatus that can reduce a friction portion and noise and improve power efficiency and thereby can transform a reciprocating rotary motion to a uni-directional rotary motion.

Technical Solution

According to an aspect of the present invention, there is provided a reciprocating rotary power transforming apparatus including: a reciprocating rotary axis (member) receiving or outputting a reciprocating rotary motion; at least one uni-directional rotary axis (member) receiving or outputting a uni-directional rotary motion and including a tilted shaft arm on its one side; a housing being disposed so that the reciprocating rotary axis and the uni-directional rotary axis may be orthogonal to each other on the same plane and being supported to un-restrict its rotation; and a motion transforming unit being connected to the reciprocating rotary axis and being constructed to perform transformation between the reciprocating rotary motion and the uni-directional rotary motion by a conical rotary motion and a twisting motion when power is transferred to the reciprocating rotary axis or to the uni-directional rotary axis.

Advantageous Effects

Constituent elements of an apparatus according to the present invention include a crank pin, a pair of guide bearings, and a guide member and thus the apparatus is in a very simple configuration. Accordingly, it is possible to easily maintain and repair a crank instrument and reduce a total manufacturing cost.

A reciprocating rotary power transforming apparatus according to the present invention may readily perform a reciprocating rotary motion and a uni-directional rotary motion and reduce a friction portion. Accordingly, noise barely occurs.

DESCRIPTION OF DRAWINGS

FIG. 1a is a cross-sectional view where a reciprocating rotary axis is forward rotated in a reciprocating rotary power transforming apparatus according to an embodiment of the present invention;

FIG. 1b is a cross-sectional view where the reciprocating rotary axis is backward rotated in the reciprocating rotary power transforming apparatus in FIG. 1a;

FIG. 2 is an exploded perspective view of the reciprocating rotary power transforming apparatus excluding a housing in FIG. 1a;

FIG. 3 is a top plane view of the reciprocating rotary power transforming apparatus excluding a housing in FIG. 1a;

FIG. 5 is a perspective view of a pair of guide bearings shown in FIG. 1a;

FIG. 6 is a conceptual diagram illustrating a rotation orbit of a crank pin, a tilted shaft arm, a reciprocating rotary axis, and a uni-directional rotary axis shown in FIG. 1a;

BEST MODE

Figure 3:
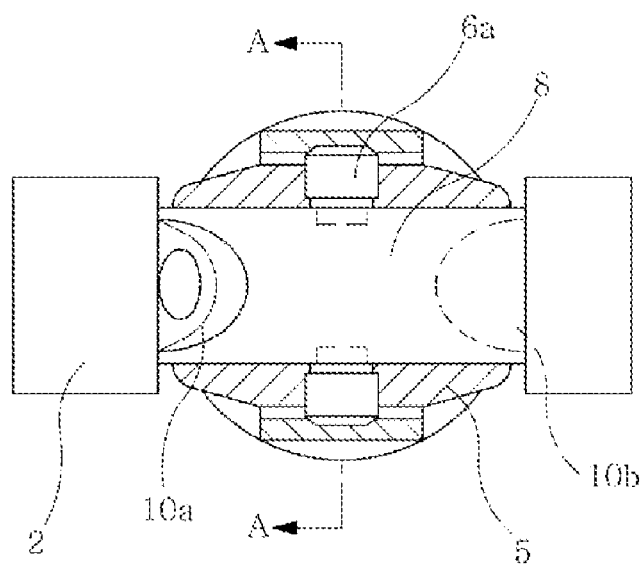

The present invention includes: a reciprocating rotary axis receiving or outputting a reciprocating rotary motion; at least one uni-directional rotary axis receiving or outputting a uni-directional rotary motion and including a tilted shaft arm on its one side; a housing being disposed so that the reciprocating rotary axis and the uni-directional rotary axis may be orthogonal to each other on the same plane and being supported to un-restrict its rotation; and a motion transforming unit being connected to the reciprocating rotary axis and being constructed to perform transformation between the reciprocating rotary motion and the uni-directional rotary motion by a conical rotary motion and a twisting motion when power is transferred to the reciprocating rotary axis or to the uni-directional rotary axis.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIGS. 1*a* and 1*b* are cross-sectional views illustrating a reciprocating rotary power transforming apparatus transforming a reciprocating rotary motion to a uni-directional rotary motion according to an embodiment of the present invention, and FIG. 2 is an exploded perspective view of the reciprocating rotary power transforming apparatus excluding a housing in FIG. 1*a*.

The reciprocating rotary power transforming apparatus includes a reciprocating rotary axis 1 receiving or outputting a reciprocating rotary motion, a uni-directional rotary axis 2 receiving or outputting a uni-directional rotary motion, a housing 3 being disposed so that the reciprocating rotary axis 1 and the uni-directional rotary axis 2 may be orthogonal to each other on the same plane and being supported to un-restrict its rotation, and a motion transforming unit being connected to the reciprocating rotary axis 1 and being constructed to perform transformation between the reciprocating rotary motion and the uni-directional rotary motion by a conical rotary motion and a twisting motion when power is transferred to the reciprocating rotary axis 1 or to the uni-directional rotary axis 2.

The motion transforming unit enables the reciprocating rotary axis 1 and the uni-directional rotary axis 2 to perform the conical rotary motion and the twisting motion on the same plane and thereby perform transformation between the reciprocating rotary motion and the uni-directional rotary motion.

Figure 4:
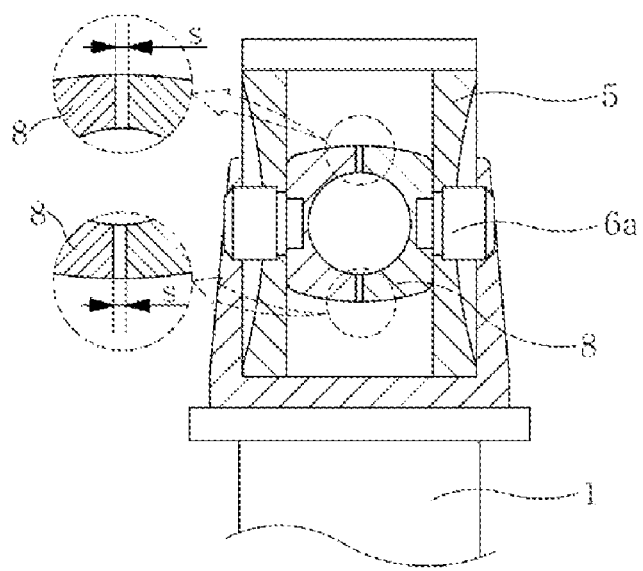
FIG. 4 is a cross-sectional view cut along a line A-A of FIG. 3.
Figure 7:
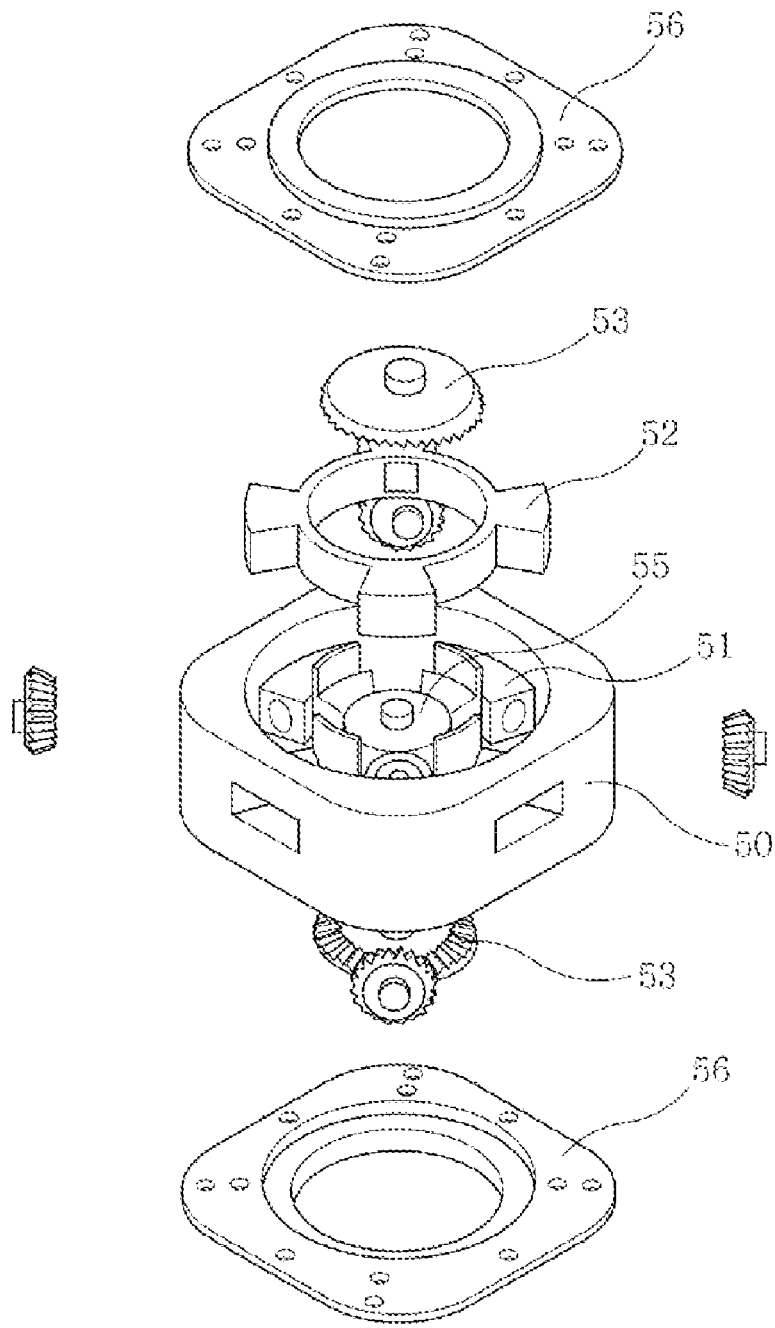
FIG. 7 is an exploded perspective view illustrating a conventional power transforming apparatus transforming a reciprocating rotary motion to a uni-directional rotary motion.
Figure 8:
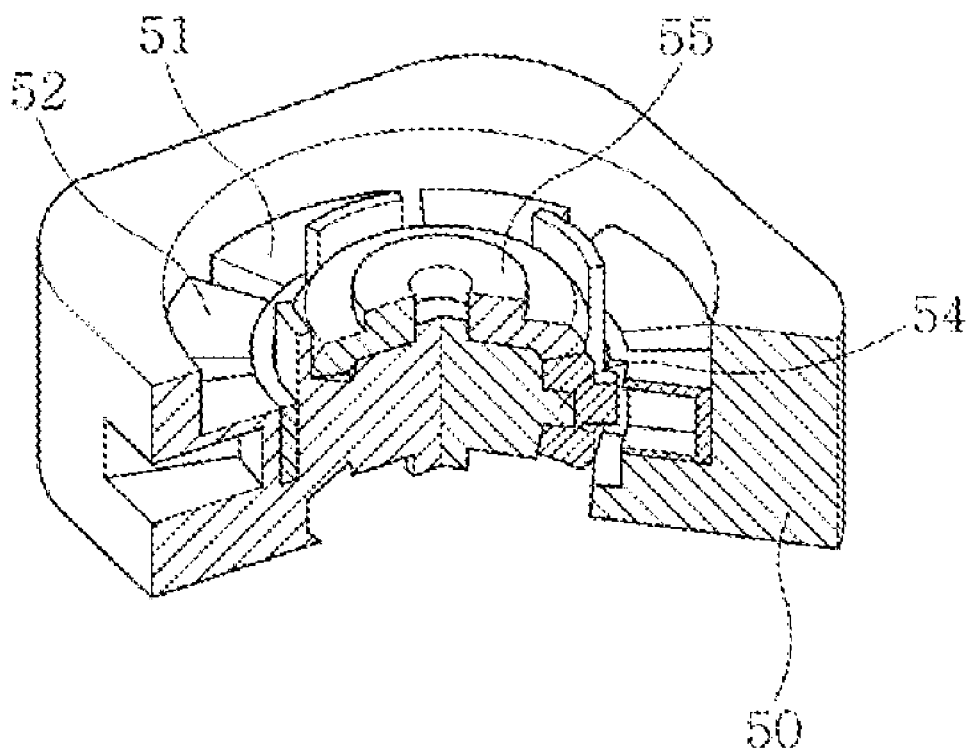
FIG. 8 is a partially folded perspective view of the power transforming apparatus shown in FIG. 7.

As shown in FIGS. 1A through 4, the motion transforming unit includes a guide member 5 that is integrally coupled with the reciprocating rotary axis 1 and is formed in a "U" shape to have a hollow portion and includes a rotary hole 4 in its central portion, a cover 7 that is coupled with a top surface of the guide member 5 and includes a protruded first rotary axis (axle) 6 to be rotatably supported by the housing 3, a pair of guide bearings that is inserted into the hallow portion of the guide member 5 and is coupled with a second rotary axis (axle) 6*a* via the rotary hole 4 (see FIG. 1*a*) to thereby perform the rotary twisting motion, a crank pin 9 that is disposed between the pair of guide bearings 8 and slides to perform the conical rotary motion, and first and second shaft arms 10*a* and 10*b* that are coupled with both ends of the crank pin 9 at a predetermined angle and are rotatably coupled with the uni-directional rotary axis 2 in the housing 3.

As shown in FIG. 2, the crank pin 9 is disposed between the pair of guide bearings 8. Both ends of the crank pin 9 are fixed to the first and the second tilted shaft arms 10*a* and 10*b* of the uni-directional rotary axis 2. The crank pin 9 centrally contacts with the second rotary axis 6*a* to perform the conical rotary motion.

The first and the second tilted shaft arms 10*a* and 10*b* are disposed in the housing 3 to be positioned on the same plane with the uni-directional rotary axis 2. A tilted angle of the crank pin 9 is "θ", which matches a rotation angle of the reciprocating rotary axis 1.

Friction may occur in two contact surfaces between the guide member 5 and the pair of guide bearings 8, and between the crank pin 9 and the pair of the guide bearings 8 when the crank pin 9 performs the conical rotary motion. Therefore, a lubricating unit may be provided to reduce the friction.

As shown in FIGS. 2 and 5, the lubricating unit includes an oil groove 0 that is formed on the side of each of the pair of guide bearings 8 to guide a filled lubricating oil in the contact surface between the guide member 5 and the pair of guide bearings 8, and a gap S that is formed in a contacting portion of the pair of guide bearings 8 to guide the lubricating oil into the contacting surface between the pair of guide bearings 8 and the crank pin 9.

A bearing 11 and the like is provided in a rotary portion such as a rotary axis that fixes the reciprocating rotary axis 1 and the uni-directional rotary axis 2 in order to reduce friction in rotation.

Hereinafter, an operational principle of the reciprocating rotary power transforming apparatus according to an embodiment of the present invention will be described.

According to an embodiment of the present invention, a process of transforming the reciprocating rotary motion to the uni-directional rotary motion of the uni-directional rotary axis 2 via the power transforming apparatus when a reciprocating rotary power is transferred to the reciprocating rotary axis 1 in a reciprocating rotary instrument such as a piston of an engine will be described. An example of transforming the uni-directional rotary motion to the reciprocating rotary motion will be not described herein, but all the processes according to the present embodiment may be inversely performed.

FIG. 1*a* shows a state where the reciprocating rotary axis 1 rotates clockwise from a top view. When the reciprocating rotary axis 1 rotates, the guide member 5 rotates clockwise and the crank pin 9 inserted into a middle also rotates.

When the crank pin 9 receives a rotary force into C direction due to the guide member 5, both ends of the crank pin 9 perform the conical rotary motion based on the second rotary axis 6*a*. The rotary force functions as a force to rotate, into "A2" direction, the uni-directional rotary axis 2 that is eccentrically coupled with the crank pin 9 at a predetermined angle via the first and the second tilted shaft arms 10*a* and 10*b*.

FIG. 6 shows the rotation orbit of the crank pin 9, the reciprocating rotary axis 1 and the uni-directional rotary axis 2, and the first and the second shaft arms 10*a* and 10*b*. Both ends of the crank pin 9 perform the conical rotary motion based on the second rotary axis 6*a*.

Friction may occur between the guide member 5 and the pair of guide bearings 8, and between the pair of guide bearings 8 and the crank pin 9, but friction may be reduced by the lubricating oil that is filled in the oil groove 0 and the gap S of the guide bearings 8. Accordingly, it is possible to reduce the energy loss.

When the rotational direction of the reciprocating rotary axis 1 is changed into "B1" direction, it may be like FIG. 1*b*. The crank pin 9 may perform the conical rotary motion by the reciprocating rotary motion, whereby the uni-directional rotary axis 2 consecutively performs the rotary motion.

So that the uni-directional rotary axis 2 may consecutively perform the uni-directional rotary motion by the conical rotary motion of the crank pin 9, both ends Pa and Pb of the crank pin 9 may need to be set to make points P1 and P2 on the same horizontal surface of the uni-directional rotary axis 2 become end points of the directional rotary motion, when rotation is performed in A2 and B2 directions.

Specifically, when the reciprocating rotary axis 1 completes rotation in A1 direction and is about to rotate into B1 direction corresponding to the inverse direction, and in this instance, one end Pa of the crank pin 9 completes rotation in A2 direction and reaches P1, another end Pb of the crank pin 9 rotates in B2 direction toward P2 although the rotational direction of the reciprocating rotary axis 1 changes. Consequently, the crank pin 9 may perform the complete conical motion, which results in causing consecutive rotation of the uni-direction rotary axis 2 in the same direction.

When the uni-directional rotary axis 2 consecutively rotates in the same direction by the reciprocating rotation of the reciprocating rotary axis 2, a crank instrument in a simple structure and with reduced friction portion may transform the reciprocating rotary motion to the uni-directional rotary motion.

When the uni-directional rotary force is transferred to the uni-directional rotary axis 2, the uni-directional rotary force is transformed to a reciprocating motion of the guide member 5 via the first and the second tilted shaft arms 10a and 10b, and the crank pin 9, whereby the reciprocating rotary axis 1 performs the reciprocating rotary motion.

INDUSTRIAL APPLICABILITY

A reciprocating rotary power transforming apparatus according to the present invention may be applicable to a power transforming apparatus in various fields of vehicles, robots, and industries. Particularly, the reciprocating rotary power transforming apparatus may be easily applicable to a power transforming apparatus that transforms a reciprocating rotary motion to a uni-directional rotary motion, or transform the uni-directional rotary motion to the reciprocating rotary motion.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A reciprocating rotary power transforming apparatus comprising:
    a reciprocating rotary member receiving or outputting a reciprocating rotary motion;
    at least one uni-directional rotary member receiving or outputting a uni-directional rotary motion and including a tilted shaft arm on one side;
    a housing being disposed so that the reciprocating rotary member and the uni-directional rotary member may be orthogonal to each other on the same plane and being supported to un-restrict rotation; and
    a motion transforming unit being connected to the reciprocating rotary member and being constructed to perform transformation between the reciprocating rotary motion and the uni-directional rotary motion by a conical rotary motion and a twisting motion when power is transferred to the reciprocating rotary member or to the uni-directional rotary member, wherein the motion transforming unit comprises:
    a guide member including a hole formed on a central portion thereof to which a secondary rotary axle extends, the guide member including a hollow portion inside;
    a cover being coupled with a top surface of the guide member and including a protruded first rotary axle to be rotatably supported by the housing;
    a crank pin being inserted into the hollow portion of the guide member to rotate when the guide member reciprocates, wherein both ends of the crank pin are coupled with the uni-directional rotary member through first and second tilted shaft arms, which are integrally formed with the crank pin; and
    a pair of guide bearings having a cylindrical shaped surface to be coupled with the crank pin and a flat surface to be coupled with the guide member, the pair of the guide bearings being coupled with the second rotary axle via the hole to perform rotary twisting motion.

2. The apparatus of claim 1, wherein the motion transforming unit further comprises:
    a lubricating unit reducing friction between the guide member and the pair of guide bearings and between the crank pin and the pair of guide bearing when the crank pin performs the conical rotary motion.

3. The apparatus of claim 2, wherein the lubricating unit comprises:
    an oil groove being formed on the side of each of the pair of guide bearings to guide a filled lubricating oil in the contact surface between the guide member and the pair of guide bearings; and
    a gap being formed in a contacting portion of the pair of guide bearings to guide a lubricating oil into the contacting surface between the pair of guide bearings and the crank pin.

4. A reciprocating rotary power transforming apparatus comprising:
    a housing;
    a reciprocating rotary member being connected to the housing to transfer a reciprocating rotary motion;
    at least one uni-directional rotary member being disposed to be orthogonal with respect toe the reciprocating rotary member on the same plane and including a tilted shaft arm on a side; and
    a motion transforming unit being coupled with the reciprocating rotary member, transforming a reciprocating rotary motion into a uni-directional rotary motion by a conical rotary motion when power is transferred to the reciprocating rotary member, and transforming the uni-directional rotary motion to the reciprocating rotary motion by the conical rotary motion when the power is transferred to the uni-directional rotary member, wherein the motion transforming unit comprises:

a guide member including a hole formed on a central portion thereof to which a secondary rotary axle extends, the guide member including a hollow portion inside;

a cover being coupled with a top surface of the guide member and including a protruded first rotary axle to be rotatably supported by the housing;

a crank pin being inserted into the hollow portion of the guide member to rotate when the guide member rotates, wherein both ends of the crank pin are coupled with the uni-directional rotary member through first and second tilted shaft arms, which are integrally formed with the crank pin; and a pair of guide bearings having a cylindrical shaped surface to be coupled with the crank pin and a flat surface to be coupled with the guide member, the pair of the guide bearings being coupled with the second rotary axle via the hole to perform rotary twisting motion.

* * * * *